(12) United States Patent
Williams et al.

(10) Patent No.: US 12,039,043 B2
(45) Date of Patent: Jul. 16, 2024

(54) CUSTOMER PREMISES EQUIPMENT IMPLEMENTATION OF DYNAMIC RESIDENTIAL THREAT DETECTION

(71) Applicant: Cyber adAPT, Dallas, TX (US)

(72) Inventors: Simon Williams, San Jose, CA (US);
Michael Weinberger, Dallas, TX (US);
Sam Stover, Gettysburg, PA (US);
David Kramer, Bethesda, MD (US)

(73) Assignee: CYBER ADAPT, INC., Dallas, TX (US)

( * ) Notice: Subject to any disclaimer, the term of this patent is extended or adjusted under 35 U.S.C. 154(b) by 121 days.

(21) Appl. No.: 17/538,652

(22) Filed: Nov. 30, 2021

(65) Prior Publication Data

US 2023/0169165 A1   Jun. 1, 2023

(51) Int. Cl.
*H04L 29/06* (2006.01)
*G06F 21/55* (2013.01)
*H04L 9/40* (2022.01)
*H04L 43/028* (2022.01)

(52) U.S. Cl.
CPC .......... *G06F 21/554* (2013.01); *H04L 43/028* (2013.01); *H04L 63/10* (2013.01); *H04L 63/20* (2013.01); *G06F 2221/034* (2013.01)

(58) Field of Classification Search
CPC ....... H04L 63/028; H04L 63/10; H04L 63/20; H04L 63/145; H04L 63/1433; G06F 21/554
USPC .......................................................... 726/1
See application file for complete search history.

(56) References Cited

U.S. PATENT DOCUMENTS

| 9,906,557 | B2 * | 2/2018 | Hsiung | ............... H04L 41/0893 |
| 11,570,201 | B2 * | 1/2023 | Mallis | ................. H04L 63/0236 |
| 2017/0180395 | A1 | 6/2017 | Stransky-Heilkron | |
| 2017/0295191 | A1 | 10/2017 | Choi et al. | |

(Continued)

OTHER PUBLICATIONS

Williams, Simon, et al., "Cloud-Based Implementation of Dynamic Threat Detection," filed Dec. 28, 2021, U.S. Appl. No. 17/564,192.

(Continued)

*Primary Examiner* — Longbit Chai
(74) *Attorney, Agent, or Firm* — Conley Rose, P.C.; Michael W. Piper; Elexis A. Jones

(57) ABSTRACT

A method of dynamic residential threat detection is disclosed. The method includes a packet selection component on a customer premises equipment (CPE) sending a predefined number of packets of each of a plurality of communication sessions to a detection engine based on packet selection rules. The method also includes the detection engine on the CPE receiving and inspecting the predefined number of packets. The method further includes a dynamic optimizing component on the CPE monitoring one or more factors and creating and sending updated packet selection rules based on the monitored factor(s) to the packet selection component. The method additionally comprises the packet selection component sending a different predefined number of packets of each of a second plurality of communication sessions to the detection engine based on the updated packet selection rules. The method further includes the detection engine receiving and inspecting the different predefined number of packets.

19 Claims, 4 Drawing Sheets

(56) References Cited

U.S. PATENT DOCUMENTS

2021/0184983 A1  6/2021  Ramaswamy et al.
2022/0353240 A1  11/2022 McDowall et al.

OTHER PUBLICATIONS

Williams, Simon, et al., "Hybrid Customer Premises Equipment and Cloud-Based Implementation of Dynamic Residential Threat Detection," filed Jun. 16, 2022, U.S. Appl. No. 17/842,441.

Communication from a Related U.S. Application, Notice of Allowance dated Apr. 1, 2024, U.S. Appl. No. 17/564,192, filed Dec. 28, 2021.

Communication from a Related U.S. Application, Notice of Allowance dated Apr. 4, 2024, U.S. Appl. No. 17/842,441, filed Jun. 16, 2022.

* cited by examiner

CUSTOMER PREMISES EQUIPMENT IMPLEMENTATION OF DYNAMIC RESIDENTIAL THREAT DETECTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Home network usage is changing. For example, more devices are operating on the home network and more people are working from home. In addition to the change in home network usage, there has been an overall increase in cyber security threats targeting home networks and a large number of these networks lack basic cyber security measures. As a result, home networks are more vulnerable to cyber-attacks.

SUMMARY

In an embodiment, a method of dynamic residential threat detection is disclosed. The method comprises monitoring, by a dynamic optimizing component stored in a non-transitory memory of a customer premises equipment (CPE) and executable by a processor of the CPE, a current amount of CPE resources in use. The method also comprises determining, by the dynamic optimizing component, that the current amount of CPE resources deviates from a baseline amount of CPE resources, monitoring, by the dynamic optimizing component, one or more factors including at least one of CPE load characteristics, internal threat information, external threat information, asset characteristics, or traffic protocol types, and in response to determining that the current amount of CPE resources deviates from the baseline amount of CPE resources, creating, by the dynamic optimizing component, packet selection rules based on monitoring the one or more factors. The method additionally comprises sending, by the dynamic optimizing component, the packet selection rules to a packet selection component, and sending, by the packet selection component stored in a non-transitory memory of a customer premises equipment (CPE) and executable by a processor of the CPE, a predefined number of packets of each of a plurality of communication sessions to a detection engine based on the packet selection rules. The method further comprises receiving and inspecting, by the detection engine stored in a non-transitory memory of the CPE and executable by a processor of the CPE, the predefined number of packets of each of the plurality of communication sessions, and initiating blocking of particular communication traffic based on inspecting the predefined numbers of packets of one or more of the plurality of communication sessions.

In another embodiment, a customer premises equipment (CPE) is disclosed. The CPE comprises a non-transitory memory, a processor, and a packet selection component stored in the non-transitory memory, that when executed by the processor, sends a predefined number of packets of each of a plurality of communication sessions to a detection engine based on packet selection rules. The CPE also comprises the detection engine stored in the non-transitory memory, that when executed by the processor, receives the predefined number of packets of each of the plurality of communication sessions, and inspects the predefined numbers of packets of each of the plurality of communication sessions. The CPE further comprises a dynamic optimizing component stored in the non-transitory memory, that when executed by the processor, monitors one or more factors including CPE load characteristics, internal threat information, external threat information, asset characteristics, or traffic protocol types, creates updated packet selection rules based on monitoring the one or more factors, and sends the updated packet selection rules to the packet selection component. The packet selection component is further configured to send a different predefined number of packets of each of a second plurality of communication sessions to the detection engine based on the updated packet selection rules. The detection engine is further configured to receive and inspect the different predefined number of packets of each of the second plurality of communication sessions.

In yet another embodiment, a method of dynamic residential threat detection is disclosed. The method comprises sending, by a packet selection component stored in a non-transitory memory of a customer premises equipment (CPE) and executable by a processor of the CPE, a predefined number of packets of each of a plurality of communication sessions to a detection engine based on packet selection rules, and receiving and inspecting, by the detection engine stored in a non-transitory memory of the CPE and executable by a processor of the CPE, the predefined number of packets of each of the plurality of communication sessions. The method also comprises monitoring, by a dynamic optimizing component stored in a non-transitory memory of the CPE and executable by a processor of the CPE, one or more factors including CPE load characteristics, internal threat information, external threat information, asset characteristics, or traffic protocol types, creating, by the dynamic optimizing component, updated packet selection rules based on the one or more monitored factors, and sending, by the dynamic optimizing component, the updated packet selection rules to the packet selection component. The method further comprises sending, by the packet selection component, a different predefined number of packets of each of a second plurality of communication sessions to the detection engine based on the updated packet selection rules, and receiving and inspecting, by the detection engine, the different predefined number of packets of each of the second plurality of communication sessions.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
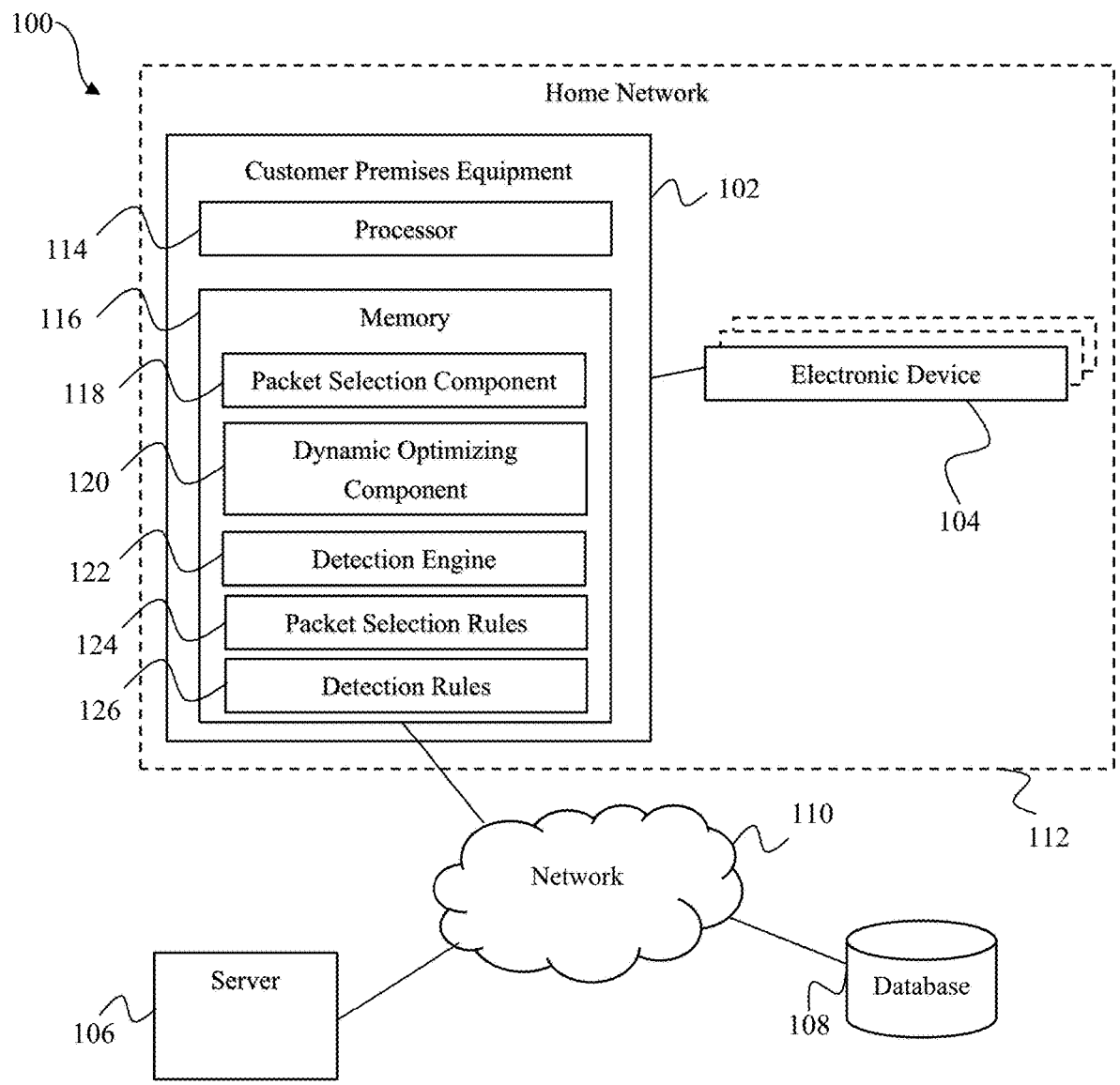
FIG. 1 is a block diagram of a dynamic residential threat detection system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Because of the growing number of devices in home networks (e.g., Internet of Things (IoT) devices), and the increased, differentiated use of home networks (e.g., working from home), as well as an increase in cyber security threats and a lack of basic cyber security measures in home networks, home networks may be more vulnerable to cyber-attacks. Existing residential threat detection solutions focus on a reputation based detection of domains and IP addresses that are blacklisted. However, this type of reputation based detection is not all that effective as it is difficult to maintain an up-to-date blacklist since the perpetrators are constantly changing domains/IP addresses. Further, mere reputation based detection misses key exploits and malicious incoming and outgoing communications especially from new or changing players or sources.

To overcome the shortcomings in existing residential threat detection solutions, the pending application is directed to using packet inspection to analyze the actual payload of incoming traffic to, outgoing traffic from, or traffic within a home network. Packet inspection may include header inspection, DNS packet inspection, TLS handshake inspection, deep packet inspection, or another type of packet inspection. Use of packet inspection allows unique indicators of a cyber-attack to be identified that are difficult for the perpetrator to change. For example, packet inspection can be used to identify threats based on indicators of malware covering file types, protocol analysis, data movement/storage, URIs, PKIs, and/or other payload attributes independent of IP address/domain. However, traditional packet inspection requires extensive resources and impacts overall network performance, which is why packet inspection is typically only practiced in robust enterprise environments that have the necessary resources and can support economic implications.

The pending application navigates the bandwidth, processing, and memory challenges associated with home networks such that packet inspection can be performed in a residential environment. In particular, the pending application leverages the benefits of packet inspection while managing the challenges of the residential environment primarily through a combination of creatively architected solutions for ease of installation and/or use by the consumer (and efficiency of the telecommunications carrier) with an optimized approach to packet inspection reducing the total resources required while providing many of the key benefits improving on existing solutions.

To manage the resource challenges associated with home networks, but still provide the benefits of packet inspection, the pending application uses a dynamically optimized type of packet inspection where a predetermined number of packets for each communication session are used for packet inspection. The predetermined number of packets may be a subset of the total amount of packets in a communication session, such as the first 10 packets or some other number of packets. The predetermined number of packets may dynamically change over time based on monitoring various internal and/or external factors such as CPE load characteristics, internal threat information, external threat information, asset characteristics, or traffic protocol types. As CPE load characteristics change, the predetermined number of packets used for packet inspection may change. The predetermined number of packets may vary depending on the type of protocol used in the communication session (e.g., encrypted protocol type, an unencrypted protocol type, a stateful session protocol type, a stateless session protocol type, etc.). The predetermined number of packets may vary depending on an internal endpoint or an external endpoint of the communication session. The predetermined number of packets may vary depending on internal threat information, external threat information, network utilization, traffic volume, time of day, geographic location, or any other relevant factors.

The specifically architected residential threat detection solution discussed herein is a customer premises equipment (CPE) implemented solution. One of the biggest challenges with a CPE implemented solution is the resource constraints of the CPE (e.g., processor, memory, bandwidth, etc.). To address this challenge, the CPE implemented dynamic residential threat detection system disclosed herein includes a dynamic optimizing component on the CPE that monitors the CPE load characteristics, internal threat information, external threat information, asset characteristics, traffic protocol types, and/or other factors and creates packet selection rules based on the monitored factor(s). The packet selection rules are applied by a packet selection component on the CPE. Based on the packet selection rules, the packet selection component at least initially sends a predefined number of packets of a plurality of communication sessions to a detection engine on the CPE. The packet selection component may apply different rules specifying different predefined numbers of packets depending on various characteristics of a given communication session (e.g., type of protocol used, an internal endpoint, an external endpoint, etc.). In order to avoid disruption of the traffic, the packet selection component may send duplicate packets to the detection engine.

The detection engine on the CPE inspects the predefined number of packets based on detection rules. For example, the detection engine may perform packet inspection of the predefined number of packets. Based on the inspection, if the detection engine identifies a potential cyber threat, particular traffic may be blocked on the CPE. Additionally, the detection engine may notify a telecommunications carrier of the blocking of the particular traffic. Alternatively, rather than the particular traffic being blocked on the CPE, the detection engine may send a notification to a telecommunications carrier identifying particular traffic to be blocked, resulting in the telecommunications carrier blocking the particular traffic. In some cases, the predefined number of packets selected and sent by the packet selection component to the detection engine may be a predefined initial number of packets, and based on the inspection of the predefined initial number of packets, the packet selection engine may select and send additional packets associated with one or more of the communication sessions to the detection engine to either collect more information/intel or to help support a decision to block or recommend blocking a particular communication.

The dynamic optimizing component may continue to monitor the factors discussed above and determine updates packet selection rules based on the monitored factor(s). In this way, packet inspection is dynamically optimized for use on a CPE with resource constraints, enabling greater cyber security for the home network while allowing the CPE and the home network to continue to operate effectively and efficiently with little to no noticeable difference to end users.

Turning to FIG. 1, a dynamic residential threat detection system 100 is described. The dynamic residential threat detection system 100 may comprise a customer premises equipment (CPE) 102, one or more electronic devices 104, a server 106, a database 108, and a network 110. The network 110 promotes communication between the components of the dynamic residential threat detection system 100. The network 110 may be any communication network including a public data network (PDN), a public switched telephone network (PSTN), a private network, and/or a combination.

The CPE 102 is telecommunications and information technology equipment kept at a customer's physical location rather than on the telecommunications carrier's premises. The CPE 102 may comprise a router, a firewall, a home gateway, an access point, and/or another component. Communication traffic to and from the electronic devices 104 may flow through the CPE 102. In some embodiments, east/west communication traffic between internal endpoints within the home network 112 may also flow through the CPE 102. The electronic devices 104 may comprise one or more of a mobile phone, a smart phone, a wearable computer, a headset computer, a laptop computer, a notebook computer, a tablet computer, an Internet of Things (IoT) device, or another device.

In an embodiment, the CPE 102 and the electronic devices 104 are located within a home network 112. The home network 112 may be located in a residential environment, such as in a home. The home network 112 may interconnect the CPE 102 and the electronic devices 104 to the Internet such as via the network 110. As discussed above, home networks, such as the home network 112, are more prone to cyber-attack because of the growing amount of devices in home networks and the increased, differentiated use of home networks, as well as an increase in cyber security threats and a lack of basic cyber security measures in home networks.

The particular dynamic residential threat detection system 100 discussed herein is a CPE implemented solution. In particular, in an embodiment, the CPE 102 comprises a processor 114 and a memory 116, as well as a packet selection component 118, a dynamic optimizing component 120, and a detection engine 122 stored in the memory 116 and executable by the processor 114. The memory 116 may also comprise packet selection rules 124 and detection rules 126.

The packet selection component 118 may select a predefined number of packets from each communication session to initially send to the detection engine 122 based on the packet selection rules 124. In an embodiment, the packet selection rules 124 may be default packet selection rules. Based on the default set of rules, the packet selection component 118 may select and send a default number such as 5 packets, 10 packets, 15 packets, or some other number of packets. The default number may depend on the type of communication protocol. In some cases, the default number may be the first 5 packets in a communication session, the first 10 packets in a communication session, the first 15 packets in a communication session, or some other number of packets potentially located in a place other than the beginning of a communication session.

In some embodiments, the packet selection component 118 sends all of the packets from one or more communication sessions to the detection engine 122. In such embodiments, in some cases, the packet selection component 118 may shift to sending a predefined number of packets less than the total number of packets based on one or more factor(s) monitored by the dynamic optimizing component 120. The predefined number of packets selected and sent by the packet selection component 118 to the detection engine 122 may be based on the packet selection rules 124. The packet selection component 118 may apply different rules specifying different predefined numbers of packets depending on various characteristics of a given communication session. The packet selection rules 124 may be dynamically updated based on one or more factor(s) monitored by the dynamic optimizing component 120.

The predefined number of packets initially selected and sent by the packet selection component 118 to the detection engine 122 may vary depending on one or more characteristics of a particular communication session based on the packet selection rules 124. For instance, the predefined number of packets at least initially selected and sent by the packet selection component 118 to the detection engine 122 may vary depending on the type of protocol used in the communication session (e.g., encrypted protocol type, an unencrypted protocol type, a stateful session protocol type, a stateless session protocol type, etc.). In one non-limiting example, if a particular communication session is encrypted, the packet selection rules 124 may indicate for the packet selection component 118 to select the unencrypted packets at the beginning of the communication session. For a Transport Layer Security (TLS) handshake, the number of unencrypted packets at the beginning of an encrypted communication session may be 4. However, that number may be more or less depending on the protocol. For an encrypted communication sessions, selecting and sending any encrypted packets following the unencrypted packets to the detection engine 122 would be a waste of resources because of the encryption. In another non-limiting example, if a particular communication session uses a stateless session protocol type, the packet selection rules 124 may indicate that the packet selection component 118 is to send all of the communication packets for the particular communication session. The stateless session protocol type may be User Datagram Protocol (UDP), which may include Domain Name System (DNS) queries, or other stateless communications.

Another factor that may affect the predefined number of packets at least initially selected and sent by the packet selection component 118 to the detection engine 122 based on the packet selection rules 124 is asset characteristics. Asset characteristics consider asset value and asset risk for a given endpoint and may comprise one or more of an internal endpoint for a communication session, an operating system type of an internal endpoint, an external endpoint for a communication session, or another characteristic of the asset. Thus, the number of packets at least initially selected and sent by the packet selection component 118 to the detection engine 122 may vary depending on an internal endpoint for a communication session, an operating system type of an internal endpoint, and/or an external endpoint for a communication session. In one non-limiting example, the packet selection rules 124 may specify that more packets from a first type of internal endpoint or external endpoint are to be selected and sent to the detection engine 122 than from a second type of internal endpoint or external endpoint. For instance, the packet selection rules 124 may specify a greater number of predefined packets are to be selected and sent by the packet selection component 118 to the detection engine 122 for communication sessions that have an internal endpoint that is a laptop, PC, phone, or another device that is used for email and may be more prone to phishing attacks than, for example, a communication session that has an internal endpoint not used for emails such as an IoT device.

In another non-limiting example, the packet selection rules 124 may specify that a lesser number of predefined packets are to be selected and sent by the packet selection component 118 to the detection engine 122 for communication sessions that have an internal endpoint that is of lower risk in terms of processing power, what the internal endpoint is connected to, and/or what is stored on the internal endpoint. In contrast, the packet selection rules 124 may specify that a greater number of predefined packets are to be selected and sent by the packet selection component 118 to the detection engine 122 for communication sessions that have an internal endpoint that is higher risk in terms of more processing power, being connected to other devices/appliances that may cause more harm, and/or having more important data (e.g., financial records, etc.) stored thereon. For example, the packet selection rules 124 may specify that a greater number of predefined packets are to be selected and sent by the packet selection component 118 to the detection engine 122 for communication sessions with a family computer in the home network 112 as an internal endpoint since it likely has more processing power and confidential information stored thereon.

Endpoints may comprise servers, laptops, desktops, set top boxes, wireless access points, routers, handsets, appliances, other network systems, new/transient devices, or other devices. As discussed above, the predefined number of packets at least initially selected and sent by the packet selection component 118 to the detection engine 122 may vary depending on an operating system type of an internal endpoint. In yet another non-limiting example, the packet selection rules 124 may indicate that a larger number of packets for communication sessions with an internal endpoint having a particular operating system (e.g., ANDROID, iOS, etc.) are to be selected and sent by the packet selection component 118 to the detection engine 122. In one additional non-limiting example, the packet selection rules 124 may indicate that a greater number of packets for communication sessions with an internal endpoint of a new/transient device within the home network 112 are to be selected and sent by the packet selection component 118 to the detection engine 122 than for communication sessions with internal endpoints of previously established devices within the home network 112.

Another factor that may affect the number of packets at least initially selected and sent by the packet selection component 118 to the detection engine 122 based on the packet selection rules 124 is threat information. The threat information may comprise internal threat information or external threat information. Internal threats may involve odd and/or concerning activity occurring within the home network 112 while external threats may involve odd and/or concerning activity occurring outside the home network 112. External threats may be based on time of day, geographic location, or other factors. The internal and/or external threat information may be stored in database 108 and sent by the server 106 to the CPE 102 for local storage. Given the limited storage capacity of the CPE 102, the threat information sent and stored in the memory 116 of the CPE 102 may need to be prioritized such that the most concerning and/or relevant threat information is sent by the server 106 to the CPE 102 for storage. The server 106 may be a computer system discussed hereinafter with reference to FIG. 4.

In order to avoid disruption of the traffic and not impact performance, the packet selection component 118 may send duplicate packets to the detection engine 122. However, in alternative embodiments, the packet selection component 118 and detection engine 122 may sit in line and act on original packets instead of duplicate packets.

In an embodiment, the packet selection component 118 compares each communication session to a whitelist. If the communication is a known, safe communication (i.e., found on the whitelist), the packet selection component 118 may not send any of the packets of the corresponding communication session to the detection engine 122. However, if the communication is not on the whitelist, the packet selection component 118 may apply the packet selection rules 124 and select and send a predefined number of packets to the detection engine 122.

The detection engine 122 may receive and inspect the predefined numbers of packets from the packet selection component 118 based on the detection rules 126. In an embodiment, the detection engine 122 performs one or more of header inspection, DNS packet inspection, TLS handshake inspection, or deep packet inspection on the received packets based on the detection rules 126. The detection rules 126 applied by the detection engine 122 may vary based on what is happening on the CPE 102. For example, different detection rules 126 (e.g., less resource intensive versus more resource intensive) may be used if CPE resources are constrained than if CPE resources are not constrained. As mentioned above, traditional packet inspection requires extensive resources and impacts overall network performance. Also, as discussed above, one of the biggest challenges with a CPE implemented solution is the resource constraints of the CPE (e.g., processor, memory, bandwidth, etc.). To address these conflicting challenges, the dynamic optimizing component 120 on the CPE 102 may monitor CPE load characteristics and other factors. For example, the dynamic optimizing component 120 may monitor processor load on the processor 114, memory load on the memory 116, load on bandwidth, and/or connections per second. The dynamic optimizing component 120 may monitor how much active traffic is being generated by the home network 112 at any given time. If the CPE 102 is overused, the underlying hardware of the CPE 102 will likely have some limitations as to how much traffic it can send to the detection engine 122 at a point in time.

Initially, a baseline amount of CPE resources may be determined. In an embodiment, until the baseline amount of CPE resources is exceeded or exceeded by a certain amount, there may be no limitations placed on the number of packets being sent by the packet selection component 118 to the detection engine 122 (i.e., all of the packets from the communication sessions may be sent). Based on monitoring processor load of the processor 114, memory load on the memory 116, load on bandwidth, and/or connections per second, the dynamic optimizing component 120 may determine that the current amount of CPE resources being used deviates from the baseline amount. The deviation may be a certain amount above or below the baseline amount of CPE resources. In response to the deviation, the dynamic optimizing component 120 may create the packet selection rules 124, which may be an updated set of rules, and sends the packet selection rules 124 to the packet selection component 118. If the dynamic optimizing component 120 determines that the current amount of CPE resources being used is above the baseline amount of CPE resources, the packet selection rules 124 may restrict the number of packets from particular communication sessions selected and sent by the packet selection component 118 to the detection engine 122.

The packet selection rules 124 created by the dynamic optimizing component 120 may be based on monitoring one or more factors including CPE load characteristics, internal threat information, external threat information, asset characteristics, traffic protocol types, or other factors. These factors have been discussed in more detail above.

The dynamic optimizing component 120 may continue to monitor the one or more factors and create updated packet selection rules based on the continued monitoring of the one or more factors. In an embodiment, the dynamic optimizing component 120 may continue to monitor current CPE resources being used, and if the dynamic optimizing component 120 determines that the current amount of CPE resources being used is below the baseline amount of CPE resources, the dynamic optimizing component 120 may create updated packet selection rules and replace the packet selection rules 124 with the updated packet selection rules such that the packet selection component 118 applies the updated packet selection rules. The updated packet selection rules may loosen restrictions on the number of packets from particular communication sessions selected and sent by the packet selection component 118 to the detection engine 122 (i.e., a greater predefined number of packets may be selected and sent than when the current amount of CPE resources exceeded the baseline amount of CPE resources).

Based on the outcome of the inspection performed by the detection engine 122, a number of actions may take place. For example, particular traffic may be blocked or quarantined on the CPE 102. In some cases, the detection engine 122 may notify a telecommunications carrier of the blocking that occurred on the CPE. Alternatively, rather than blocking the particular traffic on the CPE, the detection engine may notify a telecommunications carrier to block particular communication traffic. In response to receiving the notification, the telecommunications carrier may block the particular communication traffic.

In some cases, after inspecting the predefined number of packets but before blocking the particular communication traffic, the detection engine 122 may receive and inspect additional packets pertaining to the communication session(s) from the packet selection component 118. Based on inspecting the additional packets, the detection engine 122 may determine whether or not to block certain communication traffic and/or notify the telecommunications carrier. In other cases, after inspecting the predefined number of packets, the detection engine 122 may receive and inspect additional packets pertaining to one or more of the communication sessions from the packet selection component 118 after blocking the particular communication traffic and/or notifying the telecommunications carrier in order to gather more information/intel.

In an embodiment, the detection engine 122 executes on a dedicated central processing unit (CPU) core of the CPE 102. In other embodiments, the detection engine 122 may run in shared memory and be executed using a shared processor.

Figure 2:
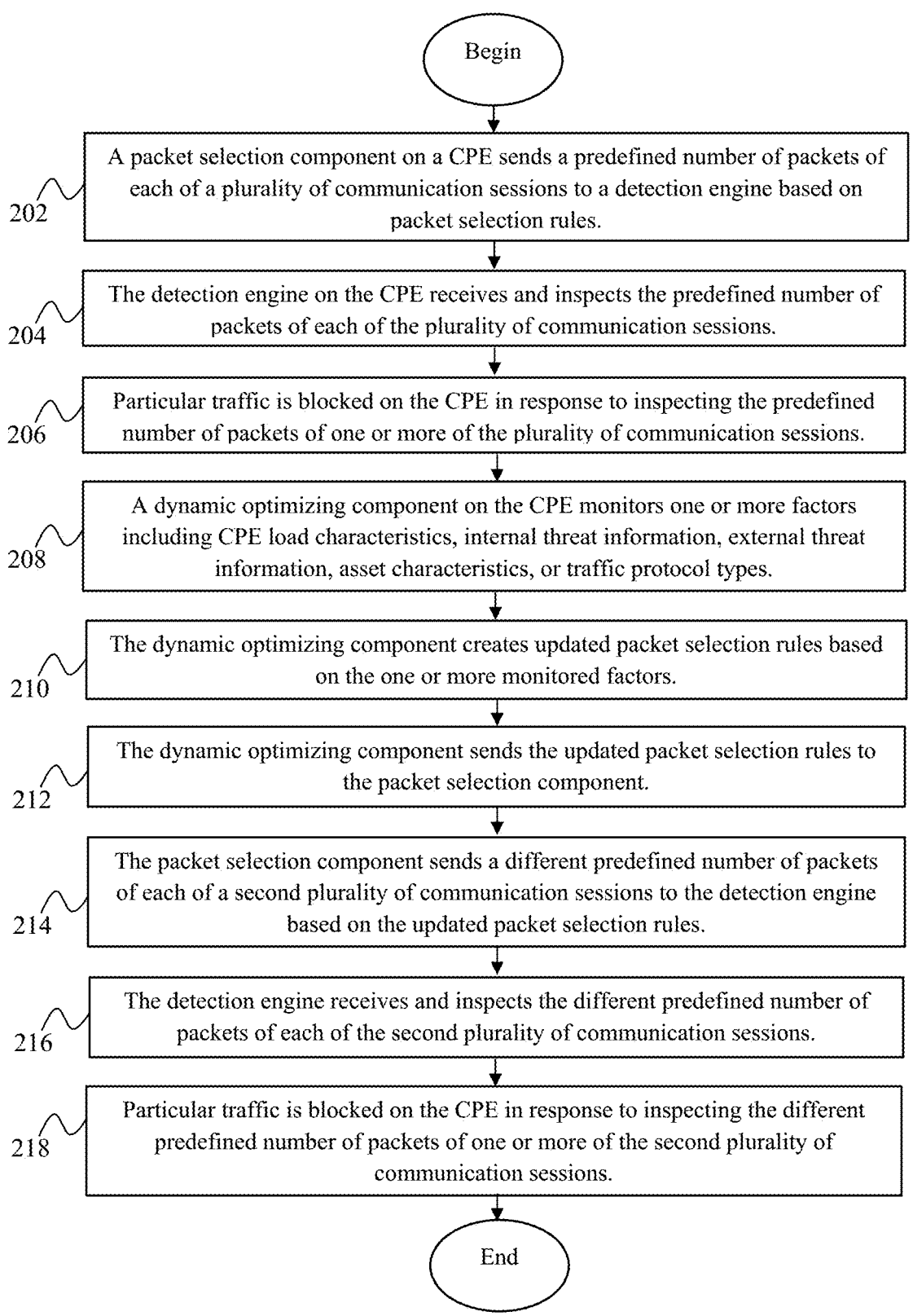
FIG. 2 is a flow chart of a dynamic residential threat detection method according to an embodiment of the disclosure.

Turning now to FIG. 2, a method of dynamic residential threat detection is described. At block 202, a packet selection component (e.g., packet selection component 118) on a CPE (e.g., CPE 102) sends a predefined number of packets of each of a plurality of communication sessions to a detection engine (e.g., detection engine 122) based on packet selection rules. At block 204, the detection engine on the CPE receives and inspects the predefined number of packets of each of the plurality of communication sessions. At block 206, particular traffic is blocked on the CPE in response to inspecting the predefined numbers of packets of one or more of the plurality of communication sessions.

At block 208, a dynamic optimizing component (e.g., dynamic optimizing component 120) on the CPE monitors one or more factors including CPE load characteristics, internal threat information, external threat information, asset characteristics, or traffic protocol type. At block 210, the dynamic optimizing component creates updated packet selection rules based on one or more monitored factors. At block 212, the dynamic optimizing component sends the updated packet selection rules to the packet selection component. At block 214, the packet selection component sends a different predefined number of packets of each of a second plurality of communication sessions to the detection engine based on the updated packet selection rules. At block 216, the detection engine receives and inspects the different predefined number of packets of each of the second plurality of communication sessions. At block 218, particular traffic is blocked on the CPE in response to inspecting the different predefined number of packets of one or ore of the second plurality of communication sessions.

Figure 3:
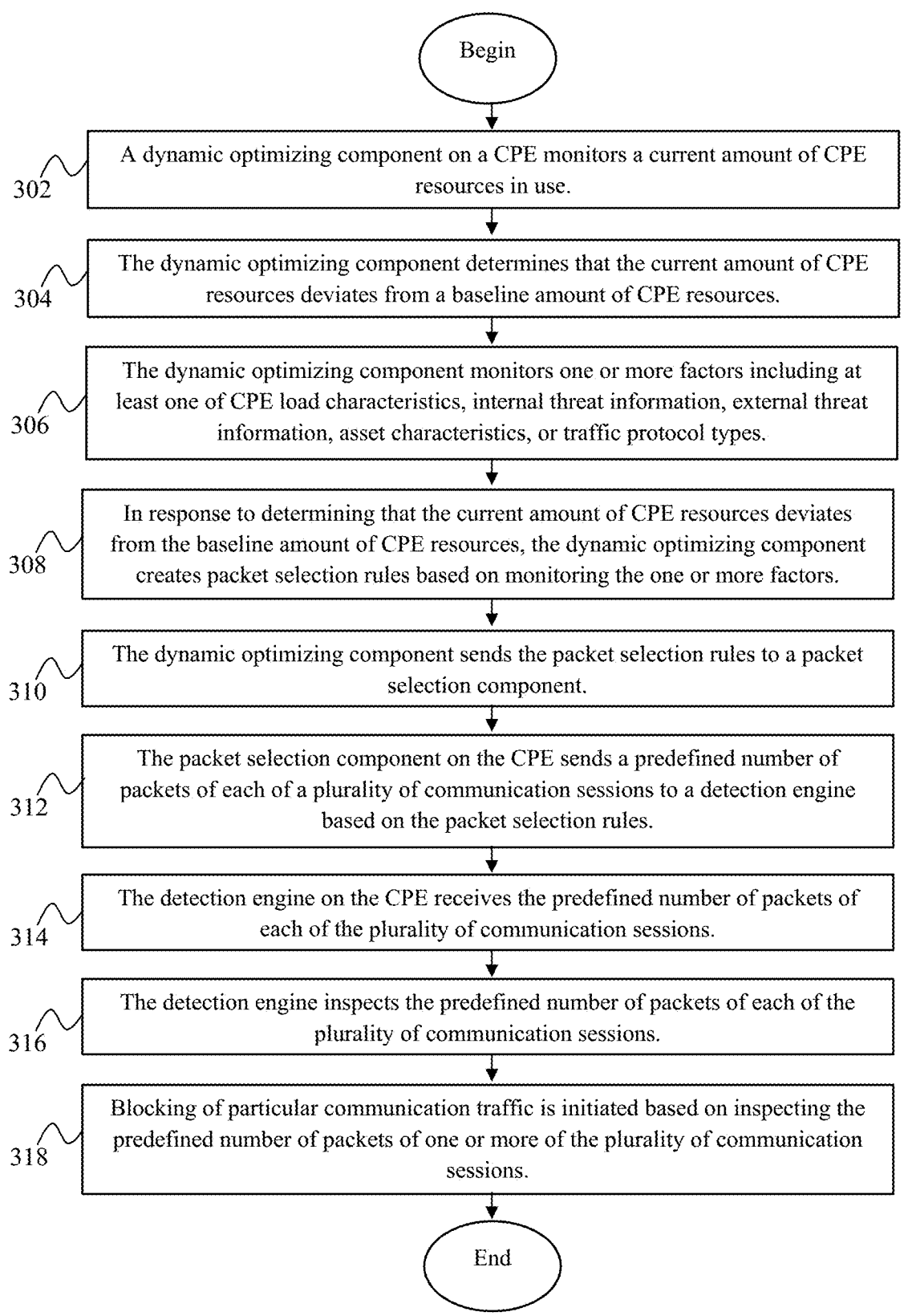
FIG. 3 is a flow chart of a dynamic residential threat detection method according to an embodiment of the disclosure.

Turning now to FIG. 3, a method of dynamic residential threat detection is described. At block 302, a dynamic optimizing component (e.g., dynamic optimizing component 120) on a CPE (e.g., CPE 102) monitors a current amount of CPE resources in use. At block 304, the dynamic optimizing component determines that the current amount of CPE resources deviates from a baseline amount of CPE resources. At block 306, the dynamic optimizing component monitors one or more factors including at least one of CPE load characteristics, internal threat information, external threat information, asset characteristics, or traffic protocol types. At block 308, in response to determining that the current amount of CPE resources deviates from the baseline amount of CPE resources, the dynamic optimizing component creates packet selection rules based on monitoring the one or more factors. At block 310, the dynamic optimizing component sends the packet selection rules to a packet selection component (e.g., packet selection component 118).

At block 312, the packet selection component sends a predefined number of packets of each of a plurality of communication sessions to a detection engine (e.g., detection engine 122) based on the packet selection rules. At block 314, the detection engine on the CPE receives the predefined number of packets of each of the plurality of communication sessions. At block 316, the detection engine inspects the predefined number of packets of each of the plurality of communication sessions. At block 318, blocking of particular communication traffic is initiated based on inspecting the predefined number of packets of one or more of the plurality of communication sessions.

Figure 4:
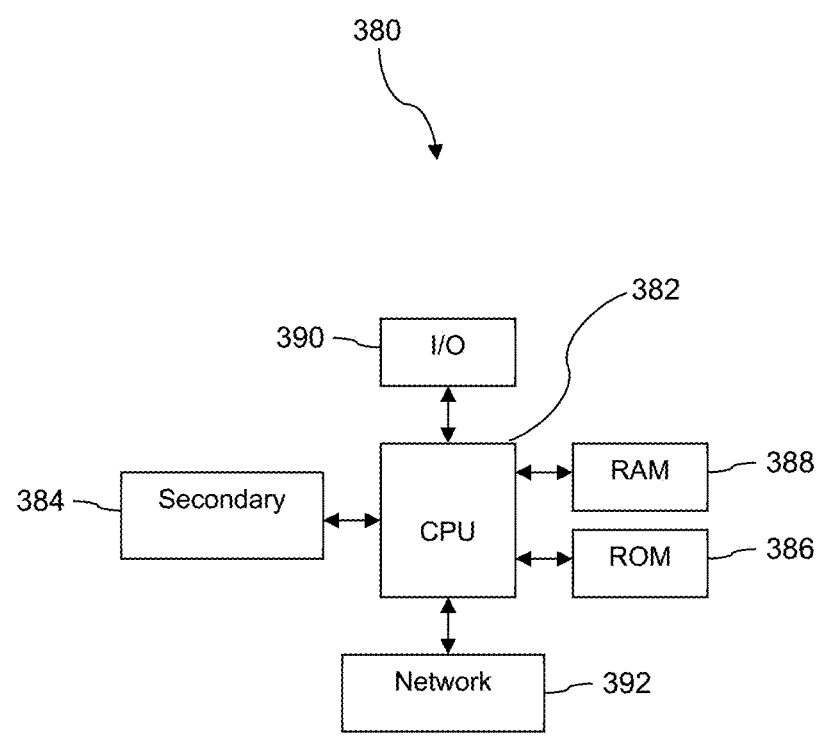
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the context of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of dynamic residential threat detection, comprising:
monitoring, by a dynamic optimizing component stored in a non-transitory memory of a customer premises equipment (CPE) and executable by a processor of the CPE, a current amount of CPE resources in use;
determining, by the dynamic optimizing component, that the current amount of CPE resources deviates from a baseline amount of CPE resources;
monitoring, by the dynamic optimizing component, asset characteristics, traffic protocol types, CPE load characteristics, and threat information;
in response to determining that the current amount of CPE resources deviates from the baseline amount of CPE resources, creating, by the dynamic optimizing component, packet selection rules based on monitoring the asset characteristics, the traffic protocol types, and the threat information , wherein the packet selection rules specify what predefined number of packets for each communication session are to be used for packet inspection, wherein the predefined number of packets dynamically changes over time based on monitoring the asset characteristics, the traffic protocol types, and the threat information , and wherein the packet selection rules specify a greater predefined number of packets to be inspected based on the threat information when an endpoint of a given communication session possess first asset characteristics including one or more of a first operating system, being connected to a first endpoint, or storing a first type of data than when the endpoint of the given communication session possess second asset characteristics including one or more of a second, different operating system, being connected to a second, different endpoint, or storing a second, different type of data, and wherein the packet selection rules specify a greater predefined number of packets to be inspected when a first traffic protocol type is used in the given communication session than when a second, different traffic protocol type is used in the given communication session;

sending, by the dynamic optimizing component, the packet selection rules to a packet selection component;

sending, by the packet selection component stored in a non-transitory memory of a customer premises equipment (CPE) and executable by a processor of the CPE, the predefined number of packets of each of a plurality of communication sessions to a detection engine based on one or more of the packet selection rules;

receiving, by the detection engine stored in a non-transitory memory of the CPE and executable by a processor of the CPE, the predefined number of packets of each of the plurality of communication sessions;

inspecting, by the detection engine, the predefined number of packets of each of the plurality of communication sessions; and initiating blocking of particular communication traffic based on inspecting the predefined numbers of packets of one or more of the plurality of communication sessions.

2. The method of claim 1, wherein initiating blocking of the particular communication traffic comprises at least one of blocking the particular communication traffic on the CPE or notifying the telecommunications carrier about blocking the particular communication traffic.

3. The method of claim 1, wherein the CPE load characteristics comprise one or more of processor load, memory load, bandwidth load, or connections per second.

4. The method of claim 1, wherein the traffic protocol types comprise one or more of an encrypted protocol type, an unencrypted protocol type, a stateful session protocol type, or a stateless session protocol type.

5. The method of claim 1, further comprising:
subsequently monitoring, by the dynamic optimizing component, one or more factors including at least one of CPE load characteristics, internal threat information, external threat information, asset characteristics, or traffic protocol types;
creating, by the dynamic optimizing component, an updated set of rules for packet selection based on subsequently monitoring the one or more factors; and
sending, by the dynamic optimizing component, the updated set of rules to the packet selection component, wherein a different predefined number of packets of each of a second plurality of communication sessions are sent to the detection engine for inspection based on the updates set of rules.

6. The method of claim 1, wherein the predefined number of packets are duplicates of packets from the plurality of communication sessions.

7. The method of claim 1, wherein the threat information comprises at least one of internal threat information or external threat information.

8. A customer premises equipment (CPE) comprising:
a non-transitory memory;
a hardware processor;
a packet selection component stored in the non-transitory memory, that when executed by the processor, sends a predefined number of packets of each of a plurality of communication sessions to a detection engine based on packet selection rules;
the detection engine stored in the non-transitory memory, that when executed by the processor:
receives the predefined number of packets of each of the plurality of communication sessions, and
inspects the predefined numbers of packets of each of the plurality of communication sessions; and
a dynamic optimizing component stored in the non-transitory memory, that when executed by the processor:
monitors asset characteristics, threat information, and one or more additional factors including CPE load characteristics or traffic protocol types,
creates updated packet selection rules based on monitoring the asset characteristics, the threat information, and the one or more additional factors, wherein the updated packet selection rules specify what predefined number of packets for each communication session are to be used for packet inspection, wherein the predefined number of packets dynamically changes over time based on monitoring the asset characteristics, the threat information, and the one or more additional factors, wherein the updated packet selection rules specify a greater predefined number of packets to be inspected based on the threat information when an endpoint of a given communication session possess first asset characteristics including one or more of a first operating system, being connected to a first endpoint, or storing a first type of data than when the endpoint of the given communication session possess second asset characteristics including one or more of a second, different operating system, being connected to a second, different endpoint, or storing a second, different type of data, and wherein the updated packet selection rules specify a greater predefined number of packets to be inspected when a first traffic protocol type is used in the given communication session than when a second, different traffic protocol type is used in the given communication session, and
sends the updated packet selection rules to the packet selection component, wherein the packet selection component is further configured to send a different predefined number of packets of each of a second plurality of communication sessions to the detection engine based on one or more of the updated packet selection rules, and wherein the detection engine is further configured to receive and inspect the different predefined number of packets of each of the second plurality of communication sessions.

9. The CPE of claim 8, wherein the inspection of the predefined number of packets of the plurality of communication sessions comprises performing deep packet inspection.

10. The CPE of claim 8, wherein the detection engine executes on a dedicated central processing unit (CPU) core of the CPE.

11. The CPE of claim 8, wherein the predefined number of packets for at least one of the plurality of communication sessions is a predefined initial number of packets, and wherein the packet selection component selects additional packets from the at least one of the plurality of communication sessions based on the inspection of the predefined initial number of packets and sends the additional packets to the detection engine for inspection.

12. The CPE of claim 8, wherein the CPE load characteristics comprise one or more of processor load, memory load, bandwidth load, or connections per second, and wherein the threat information comprises at least one of internal threat information or external threat information.

13. The CPE of claim 8, wherein the traffic protocol types comprise one or more of an encrypted protocol type, an unencrypted protocol type, a stateful session protocol type, or a stateless session protocol type.

14. A method of dynamic residential threat detection, comprising:
   sending, by a packet selection component stored in a non-transitory memory of a customer premises equipment (CPE) and executable by a processor of the CPE, a predefined number of packets of each of a plurality of communication sessions to a detection engine based on packet selection rules;
   receiving and inspecting, by the detection engine stored in a non-transitory memory of the CPE and executable by a processor of the CPE, the predefined number of packets of each of the plurality of communication sessions;
   monitoring, by a dynamic optimizing component stored in a non-transitory memory of the CPE and executable by a processor of the CPE, asset characteristics, traffic protocol types, and threat information;
   creating, by the dynamic optimizing component, updated packet selection rules based on the asset characteristics, the traffic protocol types, and the threat information, wherein the updated packet selection rules specify what predefined number of packets for each communication session are to be used for packet inspection, wherein the predefined number of packets dynamically changes over time based on monitoring the asset characteristics, the traffic protocol types, and the threat information, and wherein the updated packet selection rules specify a greater predefined number of packets to be inspected based on the threat information when an endpoint of a given communication session possess first asset characteristics including one or more of a first operating system, being connected to a first endpoint, or storing a first type of data than when the endpoint of the given communication session possess second asset characteristics including one or more of a second, different operating system, being connected to a second, different endpoint, or storing a second, different type of data, and wherein the updated packet selection rules specify a greater predefined number of packets to be inspected when a first traffic protocol type is used in the given communication session than when a second, different traffic protocol type is used in the given communication session;
   sending, by the dynamic optimizing component, the updated packet selection rules to the packet selection component;
   sending, by the packet selection component, a different predefined number of packets of each of a second plurality of communication sessions to the detection engine based on one or more of the updated packet selection rules; and
   receiving and inspecting, by the detection engine, the different predefined number of packets of each of the second plurality of communication sessions.

15. The method of claim 14, further comprising blocking particular traffic on the CPE based on at least one of inspecting the predefined number of packets or inspecting the different predefined number of packets.

16. The method of claim 14, wherein the packet selection rules comprise default packet selection rules, and wherein the predefined number of packets is a default number dependent on a protocol type of communication session.

17. The method of claim 14, wherein the predefined number of packets for at least one of the plurality of communication sessions is a predefined initial number of packets, the method further comprising:
   sending, by the packet selection component, additional packets from the at least one of the plurality of communication sessions to the detection engine based on the inspection of the predefined initial number of packets; and
   inspecting, by the detection engine, the additional packets.

18. The method of claim 14, further comprising:
   comparing, by the packet selection component, each communication session to a whitelist; and
   sending, by the packet selection component, the predefined number of packets for each communication session not on the whitelist.

19. The method of claim 14, wherein the threat information comprises external threat information, wherein the external threat information is received from a server and stored in a non-transitory memory of the CPE, and wherein the external threat information comprises a prioritized subset of external threat information.

* * * * *